United States Patent [19]

Wing

[11] Patent Number: 5,038,084
[45] Date of Patent: Aug. 6, 1991

[54] DRILL MOTOR CONTROL

[76] Inventor: Thomas W. Wing, 900 E. Holt Ave., Pomona, Calif. 91767

[21] Appl. No.: 568,342

[22] Filed: Aug. 15, 1990

[51] Int. Cl.⁵ .................................... H02P 5/00
[52] U.S. Cl. ............................. 318/268; 318/270; 388/811
[58] Field of Search .............. 318/256, 257, 270, 271, 318/280, 599, 602, 648; 388/811, 819

[56] References Cited

U.S. PATENT DOCUMENTS

| | | | |
|---|---|---|---|
| 4,412,158 | 11/1983 | Jefferson et al. | 388/819 |
| 4,454,459 | 6/1984 | Huber | 388/811 |
| 4,503,370 | 3/1985 | Cuneo | 388/819 |
| 4,851,743 | 7/1989 | Schmerda et al. | 388/811 |

Primary Examiner—William M. Shoop, Jr.
Assistant Examiner—Larry Moskowitz
Attorney, Agent, or Firm—Stetina and Brunda

[57] ABSTRACT

A drill motor control for periodically varying the rotational speed of a drill to increase the cutting efficiency of the drill bit is disclosed. The speed of the drill is made to vary according to a predetermined cycle such that the drill bit is permitted to bite into the material being drilled at lower speeds, and then the speed is increased to a point where maximum cutting efficiency is achieved. The drill motor control may either be a stand alone apparatus into which a conventional drill is plugged or alternatively may be incorporated into the drill itself. A closed loop control system which senses drill motor current may be utilized to cause the drill motor to slow down as current to the motor decreases when the drill bit ceases its cutting action such as when glazing occurs or when the drill bit has cut completely through the material being drilled. The drill motor control is also useful when the drill is being used as an electric screwdriver.

19 Claims, 2 Drawing Sheets

DRILL MOTOR CONTROL

FIELD OF THE INVENTION

The present invention relates generally to electric drill motors and more particularly to a drill motor control for periodically varying the rotational speed of a drill to increase the cutting efficiency of the drill bit.

BACKGROUND OF THE INVENTION

Electric drills are well known for drilling holes in various materials and for driving screws, bolts and the like. Such drill motors commonly comprise a hand held or mounted motor, a chuck for holding a drill bit, power cord, and a trigger for applying power to the drill motor. The trigger is often also capable of varying the speed of the drill motor.

In conventional drilling, the drill bit is forced at a low speed, under pressure, toward the material to be drilled, thereby permitting the leading edge of the drill bit to bite into the material. Once the leading edge of the drill bit has begun cutting, the speed of the bit can be increased to a point where maximum drilling efficiency is achieved. At this speed the drill cuts into and removes material at the fastest rate. This results in a shaving action of the bit upon the material. However, after operating at this speed momentarily, the cutting edge of the bit tends to lose its bite and must be slowed so that the process can continue.

If the speed of the bit is not reduced after it loses its bite, then the cutting efficiency drops rapidly as the bit begins to chip, or drop in and out of the shaving action.

During optimum cutting, when the shaving action is achieved, a continuous curl of the drilled material forms at the drill bit. When chipping commences, the continuous curl breaks, thus signaling to the operator a drop in cutting efficiency. Upon noticing the broken curl, the operator may reduce the speed of the drill bit until shaving action resumes.

Oftentimes, however, the user merely notices the drop in cutting efficiency and responds by increasing the drilling pressure. It is a natural tendency to increase pressure when efficiency drops. The user attempts to force the bit into the material being drilled. The drill bit, having ceased cutting, initially increases in speed. Forcing the bit into the material heats up both the bit and material, thus reducing the speed of the bit. Typically the bit begins to smoke and may lose its temper. Once the temper is lost, the bit cannot continue to cut, but rather creates a glaze within the hole and also tends to case harden the material. Home users frequently do not use cutting oil or coolant when drilling, thus worsening the problem.

Typically, lower speeds are used for larger drills. This is necessary because on a large drill bit the outer portion of the cutting edge of the drill bit travels faster relative to the material being cut than on a small one. Thus, lower speeds are required for larger bits to prevent excessive heat build up along the outer portions of the cutting edge where friction is the greatest.

Not only does chipping reduce the cutting efficiency of the drill bit, it also leads to increased heat build up and even increases the possibility of binding the bit within the material.

Different materials require various bit speeds for drilling. For instance, steel can be cut at a higher speed than concrete. Each substance also has a different ideal cycle time for achieving optimal efficiency in the cutting process.

When drilling concrete, the drill bit speed must be kept below the point where the concrete becomes glazed. Once glazing occurs, a hard surface is formed which must be penetrated before further progress can be made. A lower speed and more rapid cycling is required with concrete so that a fresh bite can be maintained at the drill bit tip to insure against the build up of heat and glazing. Also, heavy pressure is required to maintain proper contact of the drill bit tip with the material being drilled to continue the shaving action.

When drilling a material having a thickness which is less than the length of the drill bit, the drill frequently breaks through the second side of the material and can bind and twist out of the hands of the operator or otherwise cause an accident. Even in cases where the drill bit does not bind, it may distort the hole as the drill speeds up and the bit is jammed forcibly into the completed hole. The operator will attempt to release the trigger and then back the drill out, however it is common for the drill to be angled slightly prior to releasing the trigger, thus resulting in a slightly off axis hole.

Typically, the operator attempts to slow the speed of the bit when it breaks through the second side of the material. This is a fairly difficult skill to master and requires that the operator pay close attention as drilling nears completion.

As the drill begins to cut through the second surface, a portion of the tip will start to protrude and the drill motor current will rise significantly due to the increased rate of feed as the tip protrudes. It would be desirable to sense the increase in drill motor current and reduce the speed of the drill in order to prevent the drill bit from speeding up and possibly binding and causing an accident.

Additionally, the drill bit can bind during the drilling process, likewise twisting the drill from the operators hands and possibly causing injury. In this case, drill motor current increases as the bit binds and the motor is prevented from turning. Thus, it would also be desirable to sense an increase in drill motor current and to rapidly cut power to the drill in order to prevent further binding and possible injury.

Power screw driving is gaining rapid acceptance because of the time and effort saved when compared to manual driving. Considerable time can be saved while expending relatively little effort by using power screw driving means.

Using a drill to screw bolts, screws or like fasteners often results in damaged fastener heads or broken fasteners. This is caused by over torquing of the fastener during the screwing process. A skilled operator can control the torque being applied to the fastener by the drill by varying the speed of the drill. However, this requires a considerable amount of skill and is much more difficult than the drilling process. Accidents resulting from the screwdriver bit slipping out of the fastener head are common. An automated method of controlling the torque would therefore be very desirable.

Another common problem typically encountered when using power screwing means is twisting off the head of the fastener. This typically occurs when driving fasteners into wood which is harder than usual, when a knot is encountered, or when the pilot hole is too small or nonexistent. Frequently, the fastener cannot be driven completely into the wood. The fastener binds and as additional torque is applied, the head is broken off. This also happens when tightening small bolts and machine screws.

While many operators are able to adequately duplicate the cycle required for efficient drilling and to adequately control the torque of a drill motor when tightening fasteners, the process requires a fair amount of skill to be performed efficiently. Even the most skilled operators rarely approach the efficiency theoretically achievable. Therefore, although the prior art has recognized to a limited extent the problem of obtaining optimum efficiency in the drilling and fastener tightening processes, the proposed solutions have to date been ineffective in providing a satisfactory remedy.

SUMMARY OF THE INVENTION

The present invention specifically addresses and alleviates the above mentioned deficiencies associated in the prior art. More particularly, the present invention comprises a drill motor control for periodically varying the rotational speed of a drill to increase the cutting efficiency of the drill bit. The speed of the drill is made to vary according to a predetermined cycle such that the drill bit is permitted to bite into the material being drilled at lower speeds, and then the speed is increased to a point where maximum cutting efficiency is achieved. At the speed where maximum cutting efficiency is achieved, drill bits may tend to cease cutting occasionally, thereby requiring that the speed be decreased in order for the drill bit to once again bite into the material. The speed of the drill bit is lowered just prior to the curl being broken and cutting efficiency being lost. Thus, maximum cutting efficiency is attained and fewer problems, e.g. dulled bit and out of round holes, are encountered.

The present invention attempts to maximize cutting efficiency by limiting cutting speed to an optimum value wherein shaving action continues with an unbroken curl and cycling the speed between its maximum value and a minimum value to prevent chipping. Not only does this reduce the time required for drilling, but it also greatly increases bit life and extends the time between required sharpenings.

While such cycling may appear to reduce overall efficiency due to the slower speeds attained during the slow portion of the cycle, overall efficiency is actually increased since the time required to drill a given hole is reduced. The slow portions of each cycle also permit the dissipation of heat which is normally built up within the hole and which often causes dulling of the bit and glazing of the material being drilled. It is not necessary that the drill bit slow to a stop, but rather be cycled in a wave or surging effect which enhances the overall drilling process.

As the drill speeds up, the shaved curl is usually thinner, and as it slows down the shaved curl becomes thicker. A net cutting rate is achieved wherein a given hole can be drilled within a shorter period of time.

A cycle is defined and set into the drill motor control. The cycle period and maximum speed are set using cycle time and speed control knobs to obtain optimal cutting speed and cooler bit temperature. A mode selector permits the convenient setting of predetermined valves. Temperature is lower during the more efficient shaving process than during chipping. Bit life is increased and the time between required sharpenings is extended.

The drill bit motor control of the present invention can be adjusted to vary the speed and cycle time to permit the efficient drilling of concrete, ceramic and the like. That is, the drill speed can be slowed sufficiently and the cycle time increased to a point where glazing is unlikely and continuous shaving or cutting occurs.

When drilling concrete, the drill speed must be kept below the point at which the concrete becomes glazed. Once glazing occurs, a hard surface is formed which must then be penetrated before further progress can be made. The present invention may employ a concrete mode, wherein the drill speed is kept low and the pulsing is more rapid. Lowering the drill speed reduces heat build up and thus prevents the formation of a glaze layer. Thus, the drill bit tip is permitted to constantly cut into unglazed concrete and cutting efficiency is maximized. Heavy pressure is required in order to maintain the desired shaving action for concrete or the like. This heavy pressure increases the probability of glazing when the drill is operated at an excessive speed. The concrete mode may be beneficial in drilling of other materials which are susceptible to such glazing, such as ceramics.

The cycling action provided by the present invention can reduce heat build up in certain plastic materials which would otherwise heat up under continuous high speed cutting. This reduces the probability of the bit wandering out of the hole when the material softens, and also reduces the likelihood of distorting the material being drilled.

The drill motor control may either be a stand alone apparatus into which a conventional drill is plugged or alternatively may be incorporated into the drill itself.

A closed loop control system which senses drill motor current may be utilized to cause the drill motor to slow down or stop under certain conditions. When current to the motor decreases because the drill bit ceases its cutting action due to glazing and when the drill bit has cut completely through the material being drilled, the drill motor current decreases and bit speed increases. Slowing the bit down permits it to be safely withdrawn from the hole.

As is well known in the art, drill bits often tend to bind during operation. This commonly occurs when excessive pressure is applied when using a large size bit to drill a soft or heat sensitive material such as plastic. An excessive rate of feed can cause over cutting that stalls the bit. Such binding results in rapid torquing of the hand drill motor which can yank the drill from the user's hands. The drill motor control of the present invention can cause the disengagement of a clutch, thus isolating the drill motor armature and gears from the bit. This eliminates the effects of inertia and results in a safer and more complete removal of torque from the drill. Plastic materials can also benefit. This is particularly true of the heat sensitive ones where there can be distortion of the hole due to heat build up. The drill motor control also minimizes cracking of brittle plastic when binding occurs.

A common problem in drilling occurs when a bit of greater length than the thickness of the material being drilled is used. In such instances, the bit will break through the material being drilled and suddenly bind as the bit plunges through the incompleted hole. The flutes of the bit act like the lands of a rifle barrel or threads of a screw. This is due to the inability of the operator to hold a steady rate of feed as he could on a drill press. When the pressure of the material suddenly gives way, this action can result. This is very hard on the bit, the drill, the material being drilled, as well as the operator. In cases where the user is on a perch, this can be very dangerous.

Accidents resulting from such binding can result in material or equipment damage and occasionally in personal injury. The rapidly rotating bit can bind in the newly drilled hole, thus torquing the hand drill, and possibly causing damage and/or injuring the user. Such binding is common because the user is occasionally startled by the breakthrough and does not immediately reduce the speed of the drill, but rather may force the hand drill sideways. Even when the bit does not bind within the hole, the hole is often deformed. The drill motor control of the present invention immediately senses an increase in drill motor current as the drill breaks through the material and the drill motor control instantly cuts power to the drill motor to allow the user to safely withdraw the bit from the hole. Use of the drill motor control of the present invention reduces both the likelihood of injury to the operator and the likelihood of damaging the material being drilled.

A more complex and expensive solution is to combine the pulsed wave drilling system with a drill/impact torque clutch. A speed sensor detects the stalled bit, that is just starting to protrude through the material. The clutch now slips and is made to impact or tap the bit slowly to complete the hole. The control unit increases the speed of the motor to increase this tapping action. When the speed sensor indicates the drill is freed, the speed is reduced to allow finishing up the hole and ease the drill out of the hole.

Binding typically occurs when the bit is forced into the material at a rate which exceeds the rate at which cutting can occur. Binding of the drill bit results in a dangerous situation in which the material being drilled, the drill, and/or the drill bit can be damaged. It is also likely that the operator may be injured. Binding of the drill bit results in an increase in drill motor current which is immediately sensed by the drill motor control of the present invention. Upon sensing such an increase in current, the drill motor control instantly cuts power to the drill motor.

A bypass switch may be provided to prevent the controller from reacting to over and under current conditions. Such conditions could occur in connection with pockets of relatively hard and/or soft material disposed within the material being drilled. Such pockets mimic the conditions of drill-through and binding, and thus cause the controller to slow or shut down the drill prematurely. It would be advantageous to be able to selectively control the activation of this feature.

The drill motor control is also useful when the drill is being used as an electric screwdriver. The drill motor control prevents the screwdriver tip from damaging the screw head by applying too much torque to the screw. It also prevents the screw head from being twisted off. Cycling of power to the drill motor helps prevent heat buildup, thus reducing the occurrence of glazing and reducing friction so that the screw may be more easily inserted.

Applying torque to the fastener in a surge or wave like manner minimizes heat build up by providing a low torque portion of the cycle during which heat may dissipate into the surrounding material. This is particularly crucial as the fastener is driven further into the material. The screw threads meet increasing resistance due to having a greater surface area in contact with the material as the screw is inserted deeper. The heat then causes expansion of the metal screw and surrounding material, thus further increasing friction.

Use of a cyclic action to create a surging effect thus maximizes heat dissipation. It also permits molecularly plasticizing of the material thus allowing deeper penetration of the fastener into the material without the consequent heat build up and friction. A screw can therefore be driven completely into the material without the likelihood of the head being twisted off. Additionally, molecular movement of the material caused by the cyclic action of the fastener threads results in momentary plasticization of the material during the high torque of the cycle and a much stronger bond is obtained between the material and the fastener. Cyclic, pulsed surging or wave methods of driving fasteners allow higher peak torque than constant torque as illustrated by a diagram of estimated forces that could twist off the fastener head.

It is well known that operating a drill or electric screwdriver in a surge or pulse mode results in cutting or driving of a rate which exceeds the maximum rate achieved under steady state conditions. Thus, by repeatedly pulsing the drill or electric screwdriver, the overall operating efficiency is increased.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENT

Figure 1:
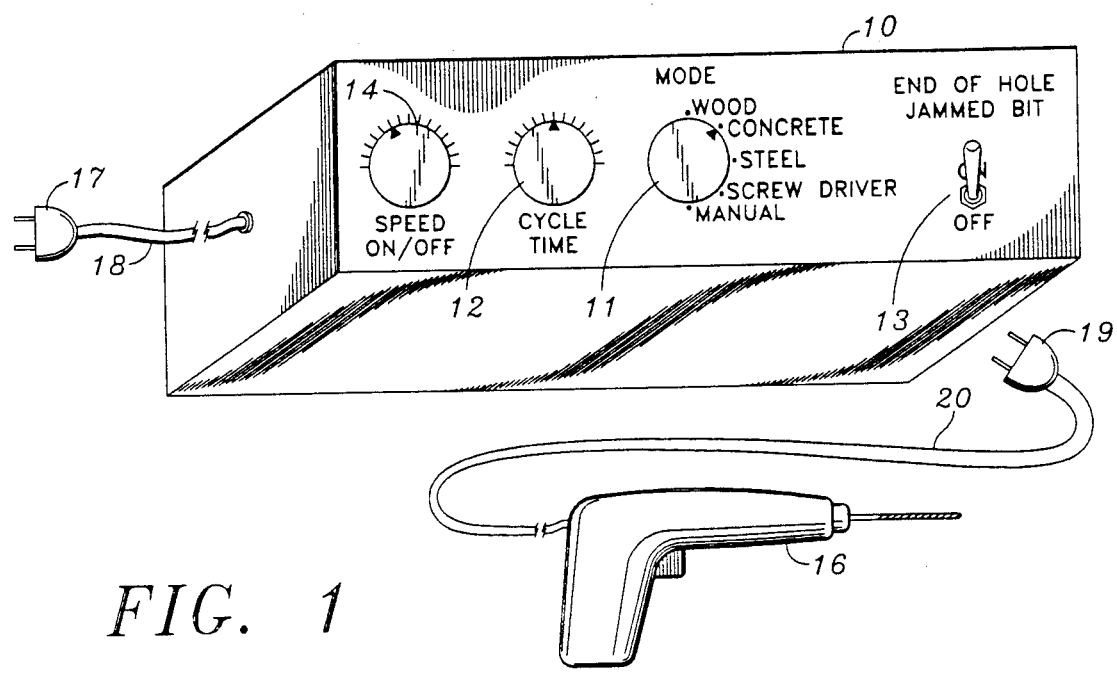
FIG. 1 is a perspective view of the drill motor control of the present invention having a hand drill connected thereto.
Figure 2:
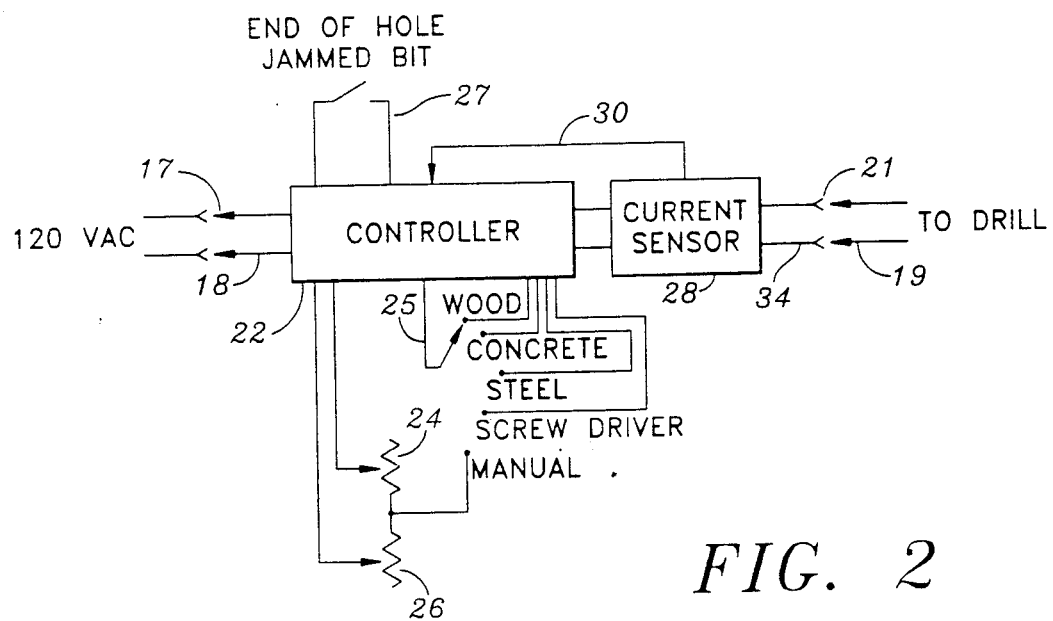
FIG. 2 is an electrical block diagram of the drill motor control of the present invention.
Figure 3:
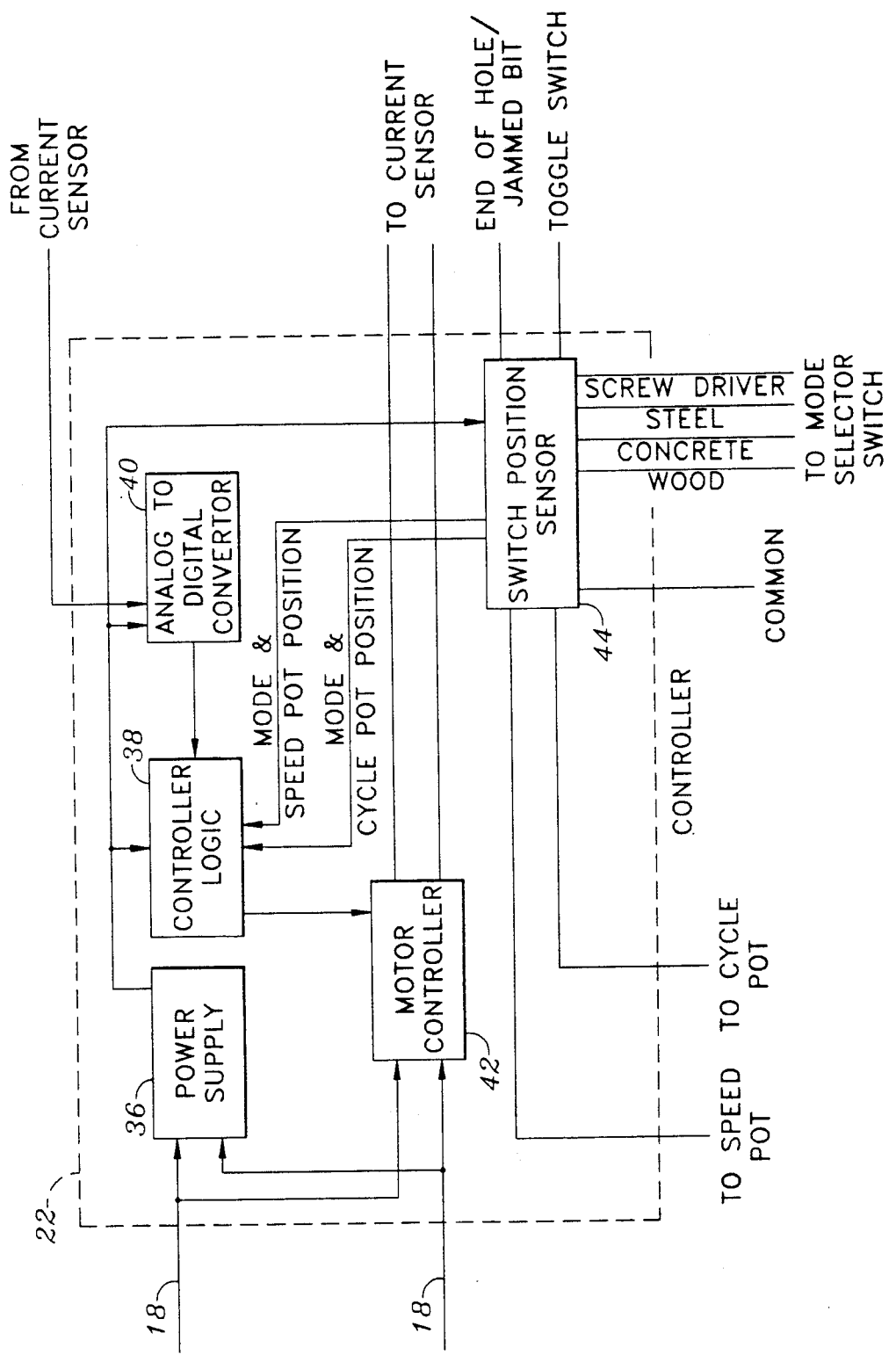
FIG. 3 is an electrical block diagram of the controller of FIG. 2.

The drill motor control of the present invention is illustrated in FIGS. 1 through 3 which depict a presently preferred embodiment of the invention.

Referring now to FIG. 1, the drill motor of the present invention may be manufactured as a stand alone device into which a conventional drill is plugged. The drill motor control 10 is plugged into a power outlet and serves to control the electrical current supplied to the drill 16 such that optimal cutting efficiency is achieved and safety features are provided. This is accomplished by periodically varying the speed of the drill 16.

A mode selector switch 11 allows the user to conveniently select predetermined speeds and cycle times for several different materials. For example, preset values can be selected for wood, concrete and steel. The correct selection optimizes drilling for the material chosen. The drill motor control 10 also has two control knobs which allow the user to manually vary the cycle time and speed of the drill 16 when the mode selector switch is in the manual position. The first or cycle control knob determines the cycle time and the second or speed control knob 14 controls the maximum speed reached during each cycle and can also be used as an on/off switch.

Alternatively, the speed control knob 14 and the cycle time control knob 12 could be operated in conjunction with the mode switch 11 such that the speed control knob 14 and the cycle time control 12 permit fine tuning of the preset values. Setting the speed control knob 14 and the cycle time control knob 12 to 12 o'clock could, for instance, provide unaltered presets while varying the controls 12 and 14 would permit fine tuning.

The manual selection of speed and cycle time is required for materials for which mode switch 11 selections are not appropriate and for accommodating variation in selectable materials. For instance, a slower than normal speed might be required for drilling an extremely hard wood such as ebony. Therefore, the speed and cycle time would be specified by placing the mode selector switch 11 in the manual position and dialing the appropriate speed and cycle time using the speed control 14 and cycle time control 12.

Additionally, a selection may be made using the mode switch 11 to designate a screw driver mode of operation. In the screwdriver mode of operation preset values for speed and cycle time are used such that the driving speed of the screw is maximized while simultaneously reducing the probability of damaging the screw or causing the bit to disengage from the screw. Thus, the time required to drive screws is reduced.

The end of hole/jammed hole toggle switch 13 enables and disables the end of hole and jammed bit sensing as discussed below.

Referring now to FIG. 2, a block diagram of the drill motor control depicts a controller 22 which receives electrical power from power cord 18 and modifies the current prior to providing power to the drill through receptacle 21. A mode selector switch 25 allows the user to conveniently select predetermined speeds and cycle times for a variety of materials as well as for driving screws. When the mode selector switch 25 is in the manual position, then the position of cycle pot 24 indicates to the controller the desired cycle time and the position of the speed pot 26 indicates to the controller 22 the desired maximum speed. Current sensor 28 measures the current being supplied to the drill and provides an output along feedback loop 30 to controller 22. The output provided along feedback loop 30 is used to permit the controller 22 to cut drill motor current when an end of hole or binding bit condition is detected. The ability of the controller 22 to cut current to the drill motor under such conditions can be disabled by placing the end of hole/jammed bit toggle switch 27 in the off position. The controller 22 is therefore responsive to the cycle pot 24, the speed pot 26 and the feedback provided by current sensor 28.

Referring now to FIG. 3, a block diagram of the controller 22 of FIG. 2 is depicted. The controller 22 is comprised of a power supply 36 which receives 120 volts AC from the power cord 18 and supplies power and logic level voltages to a controller logic 38, an analog to digital converter 40, a motor controller 42, and a switch position sensor 44.

The controller logic 38 is comprised of a suitable conventional central processing unit (CPU) and associated circuitry to process the inputs from the switch position sensor 44 and the analog to digital converter 40 and to provide an output signal to the motor controller 42. The signal output to the motor controller 42 is representative of the desired drill speed at any given point in time.

Analog to digital converter 40 receives an analog signal from current sensor 28 of FIG. 2, and converts that signal to a digital signal capable of being processed by controller logic 38.

Switch position sensor 44 supplies current to and measures the resistance of cycle pot 24 and speed pot 26 to determine their settings. It also senses the position of the mode selector switch 25 and end of hole/jammed bit toggle switch 27. In the presently preferred embodiment switch position sensor 44 contains an analog to digital converter and supplies a digital signal to the controller logic 38 which is representative of the positions of the cycle 24 and speed 26 pots as well as the mode selector switch 25 and end of hole/jammed bit toggle switch 27. Thus, the operational parameters of maximum speed and cycle time are communicated to the controller logic 38 which will use these parameters to define the drive current to the drill motor. Motor controller 42 thereby receives 120 volts AC from the power cord 18 and reduces the voltage in response to the signal received from controller logic 38.

Controller logic 38 generates a sine wave shaped cycle although those skilled in the art will recognize that similar periodic wave forms can also be used. In the preferred embodiment, the sine wave cycle is generated by the CPU within the controller logic 38. An algorithm is executed by the CPU to generate the sine wave. Such algorithms are well known. When the mode selector switch 25 is in the manual position the period of the cycle is determined by cycle potentiometer 24 and the height of the cycle is determined by speed potentiometer 26. Otherwise, the mode selector switch 25 setting determines the maximum speed and the cycle time. Therefore, the user can determine the maximum speed to which the drill is to operate during a cycle, however, the current sensor 28 can modify that speed to prevent the drill from operating at too high of a speed under particular circumstances. Such circumstances include binding of the drill bit and the excessive increase in speed caused by the breaking through of the second surface of the material being drilled.

Binding of the drill bit causes an increase in drill motor current that is immediately sensed by current sensor 28 and communicated to controller 22. This increase in current causes controller 22 to reduce the voltage supplied to the drill motor. Reducing the voltage to the drill motor reduces the torque and permits the drill bit to be repositioned manually to alleviate the binding.

Additionally, the controller 22 can cause the disengagement of an electrically operated clutch (not shown) mechanism to disengage the drill bit from the motor and gears within the drill. Inertia of the motor armature and gears tends to provide torque momentarily when power is removed from the drill motor. Thus, the use of a clutch provides an additional margin of safety by removing torque from the drill bit the instant a binding condition is sensed.

The increase in speed caused by breaking through the material being drilled is accompanied by a reduction in drill motor current. This reduction in current is sensed by the current sensor 28 and communicated to controller 22. The reduction in current causes controller 22 to reduce the voltage supplied to the drill motor, thus reducing the speed of the drill motor to a level where the bit may be safely withdrawn from the drilled hole.

The ability of the drill motor control to sense the end of the hole and to sense a binding bit can be enabled and disabled using toggle switch 27. The user may desire to disable these functions when drilling materials which give false end of hole and/or binding bit indications. This can happen with materials whose consistency varies with the depth of the hole. For example, a pocket of comparatively easy to drill material might give the indication of an end of hole condition and thus cause the drill motor to halt prematurely. Likewise, a denser area might give a false jammed bit indication and cause the drill motor to halt prematurely.

Glazing also causes the speed of the drill bit to increase. This results in the drill running faster than its optimal cutting speed and also increases the amount of glazing. Glazing occurs when the drill bit ceases cutting and begins to frictionally heat the material being drilled. The cutting edge of the drill bit does not bite into the material being out, rather it slides over it. This creates more heat and more glazing. The bit must be slowed down so that it can bite into the material being drilled. Drill motor current decreases and the drill bit speeds up during glazing since there is little resistance to the rotation of the drill bit.

The controller logic 38 compares the drill motor current sensed by current sensor 30 to the periodic sine like output that it generates. During normal drilling the drill motor speed will be approximately proportional to the drill motor current, within a pre-defined range. Therefore, a comparatively low sine like output should result in a comparatively slow drill motor speed. Conversely, a comparatively high sine like output should result in a comparatively high drill motor speed. Deviations are caused by binding of the drill bit, glazing of the drilled material, and drilling completely through the drilled material. These deviations are compensated for by the use of closed loop feedback control wherein drilled motor speed is inferred from the drill motor current and the controller logic 38 sine like output is modified to provide the desired drill motor speed.

The output of the controller logic 38 is reduced when the output of the current sensor 30 is above a predetermined offset from the output of the controller logic 38. The output of the controller logic 38 is also reduced when the output of the current sensor 30 is below a predetermined offset from the output of the controller 38.

Each of the three conditions—binding, glazing and drill through—require that the drill motor be slowed. Therefore feedback control in the present invention can only result in maintaining or reducing the speed of the drill motors, it is never increased.

Having described the structure of the drill motor control, it will be instructive to describe its use. The drill motor control 10 is first plugged into an electrical receptacle and the drill's power cord 19 is plugged into the receptacle 21 of the drill motor control 10. The mode selector switch 11 and/or the cycle time 12 and speed 14 controls are set prior to beginning the drilling process.

For instance, if the user is drilling wood, then the mode selector switch 11 will be placed in the wood position. The positions of the speed switch 14 and the cycle time switch 12 are not important unless the mode selector switch 11 is in the manual position.

To drill a material not provided for by the mode selector switch 11, place the mode selector switch 11 in the manual mode and use the speed switch 14 and the cycle time switch 12 to specify the desired maximum speed and cycle time.

If the speed and cycle time are unknown, they can be determined through simple experimentation. Set the cycle time to midscale and vary the speed control 14. Try several settings of the speed control 14 across its range of operation. Drill sufficiently at each setting to determine the effectiveness of the drilling operation. Set the speed control 14 where the optimum effectiveness was observed and then vary and set the cycle time in a similar fashion. By recording the settings, a chart for the materials commonly drilled can be constructed.

Once the drill motor control 10 has been programmed with the correct cycle time and speed settings, the operator can proceed to use the drill in the conventional manner. The operator will observe that the speed of the drill varies constantly and that the drilling process proceeds more rapidly than is typical. Binding of the drill bit will cause the drill motor's torque to be decreased, thus automatically freeing the drill bit from the bind in many instances. Glazing will be minimized, and any occurrences of glazing quickly overcome.

As the speed of the bit increases and decreases, the thickness of the curl will vary. Upon encountering a bind of the bit within the material being drilled, the drill will immediately halt, thus allowing the operator to free the bit. Upon pushing the tip of the drill bit through the opposite surface of the material, the drill will momentarily increase slightly in speed, then the speed will reduce to a level to permit easy extraction of the bit from the material. Thus, a safe and efficient means of drilling is provided.

If the drill motor is being halted an excessive number of times due to false indications of the end of the hole and/or binding of the bit, then the end of the hole/jammed bit toggle switch can be placed in the off position. This permits drilling to continue without the sensing of over and under current conditions which halt the drill motor.

To use the drill motor control for driving screws, the mode selector switch 11 is typically placed in the screwdriver position. This defines a maximum speed and cycle time which optimizes the driving process for most applications. Alternatively, the mode selector switch may be placed in the manual position and the speed control 14 and cycle time control 12 positioned appropriately. The precise positions of the speed control 14 and cycle time control 12 for any given application can be determined experimentally or gathered from a table as given above in reference to drilling.

When using the drill motor control to drive screws, the user will be able to drive the screws completely into position without damaging the screw or risking injury. The screw will be less than likely to break due to over torquing since the maximum speed is limited and the cycle time provides an adequate cool off period to allow the heat build up from friction to dissipate. The cyclic motion of the screwdriver bit also helps to prevent the bit from slipping from or disengaging the screw head. The maximum speed of the drill is the highest speed at which the fastener can be driven without damaging the fastener or having the driver bit disengage the fastener head. The cycle time is defined such that the drill motor begins to slow down just prior to that time at which the screwdriver bit would be most likely to slip out of engagement with the screw head. Thus, the screw driving process is optimized and safety is enhanced.

It is understood that the exemplary drill motor control described herein and shown in the drawings represents only a presently preferred embodiment of the invention. Indeed, various modifications and additions may be made to such embodiment without departing from the spirit and scope of the invention. For example, the exact means by which the sine wave like cycle is generated within the controller logic is not considered crucial to this invention. Also, the present invention need not be limited strictly to the use of a digital controller. Various means are contemplated of creating a cyclic operation, the period and amplitude of which can be defined by the user, for controlling the speed of a drill motor.

Also, the shape of the cyclic wave form need not be strictly limited to sine like waves. For example, the wave form could have an extended maximum speed duration resulting in a plateau shape in oases where the drilled material permits such extending of the maximum drilling speed. Many means for applying feedback signals to a generated wave form are known in the art, therefore the means by which this is accomplished is not considered crucial to this invention. Thus, these and other modifications and additions may be obvious to those skilled in the art and may be implemented to adapt the present invention for use in a variety of different applications.

What is claimed is:

1. A drill motor control for applying power to a drill in a cyclic manner, comprising:
   (a) a controller for applying power to a drill motor according to a periodic cycle to alternately permit the drill bit to bite into the material being drilled at a first speed and to increase the speed to a second speed where maximum cutting efficiency is substantially achieved; and
   (b) wherein the period and amplitude of the cycle is controllable by an operator.

2. The drill motor control as recited in claim further comprising:
   (a) a cycle control for allowing the operator to specify the length of the cycle according to which power is supplied to the drill motor; and
   (b) a speed control for allowing the user to specify the amplitude of the cycle according to which power is supplied to the drill motor.

3. The drill motor control as recited in claim 2 further comprising:
   (a) a current sensor for sensing the drill motor current; and
   (b) wherein the controller is responsive to the output of the current sensor, the output of the current sensor being representative of the drill motor current such that the drill motor speed will decrease when the sensed current is above a present level and when the sensed current is below a preset level.

4. The drill motor control as recited in claim 3 further comprising a clutch responsive to said current sensor such that said clutch disengages the drill motor from the bit when the drill motor current exceeds a preset level.

5. The drill motor control as recited in claim 3 wherein the controller comprises:
   (a) controller logic for generating a sine like cycle, the controller logic being responsive to the output of the current sensor, the controller logic outputting a signal representative of the sine like cycle generated thereby, the amplitude of the output signal being modified by the output of the current sensors; and
   (b) a motor controller responsive to the output of the controller logic, the motor controller varying the voltage supplied to the drill according to the output of the controller logic.

6. The drill motor as recited in claim 5 wherein the controller further comprises:
   (a) an analog to digital converter for converting the analog output of the current sensor into a digital signal suitable for processing by said controller logic;
   (b) a switch position sensor for detecting the settings of the cycle control and the speed control.

7. The drill motor as recited in claim 6 wherein:
   (a) the amplitude of the output signal of the controller logic is modified by being reduced when the output of the current sensor is above a predetermined offset from the output of the controller logic; and
   (d) the amplitude of the output signal of the controller logic is modified by being reduced when the output of the current sensor is below a predetermined offset from the output of the controller logic.

8. A method for improving the cutting efficiency of a drill, the method comprising the steps of:
   (a) varying the drill speed according to a sine like cycle to permit the drill bit to alternately bite into the material being drilled and then increase speed to a point of increased cutting efficiency; and
   (b) wherein the step of varying the drill speed is performed by an electronic controller.

9. The method as recited in claim 8 further comprising the steps of:
   (a) setting the maximum speed of the drill to a speed where increased cutting efficiency is obtained, this being the maximum speed attained during the sine like cycle; and
   (b) setting the cycle time to a time that which is most efficient for the material being drilled.

10. The method as recited in claim 9 further comprising the steps of:
    (a) sensing the speed of the drill motor and reducing the amplitude of the sine like cycle when the drill motor speed decreases in relation to the sine like cycle to alleviate binding of the drill bit; and
    (b) sensing the speed of the drill motor and reducing the amplitude at the sine like cycle when the drill motor speed increases above a predetermined level.

11. The method as recited in claim 10 further comprising the step of disengaging a clutch when the sensed drill motor current exceeds a preset limit to disengage the drill motor from the drill bit.

12. A method of attaining improved cutting efficiency in the drilling process, the method comprising the steps of:
    (a) electronically generating a sine like output;
    (b) varying the speed of drill cycle during the drilling process according to the sine like output;
    (c) wherein the maximum speed of the drill during the sine like cycle is approximately the speed at which the drill bit outs the material being drilled with maximum efficiency;
    (d) wherein the length of the period of the sine like cycle is approximately that period which provides maximum cutting efficiency for the material being drilled.

13. The method as recited in claim 12 wherein the step of electronically generating a sine like output comprises the step of digitally generating a sine like cycle using a CPU, the CPU executing an algorithm which determines the shape, amplitude, and period of the sine like cycle.

14. The method as recited in claim 13 wherein the step of electronically generating a sine like output further comprises the steps of:
   (a) modifying the cycle generating algorithms to vary the amplitude of the sine like cycle generated thereby to obtain the drill speed at which the drill bit cuts the material being drilled with approximately the maximum efficiency; and
   (b) modifying the cycle generating algorithm to vary the period of the sine like cycle to provide maximum cutting efficiency.

15. The method as recited in claim 14 further comprising the steps of:
   (a) sensing the current of the drill motor and providing an analog output representative of the drill motor current;
   (b) converting the analog output representative of the drill motor current to a digital output suitable for processing by the CPU;
   (c) modifying the cycle generating algorithm to reduce the amplitude of the sine like cycle to reduce the speed of the drill motor when increased drill motor current is sensed to alleviate binding of the drill bit; and
   (d) modifying the cycle generating algorithm to reduce the amplitude of the sine like cycle to reduce the speed of the drill motor when increased drill motor speed is sensed to reduce the speed of the drill bit after the material being drilled has been drilled completely through and when glazing occurs.

16. The method as recited in claim 15 further comprising the step of disengaging a clutch when the sensed drill motor current exceeds a preset limit to disengage the drill from the drill bit.

17. A method for driving fasteners with a drill, the method comprising the steps of:
   (a) electronically generating a sine like output;
   (b) varying the speed of the drill during the driving process according to the sine like output;
   (c) wherein the maximum speed of the drill ring the sine like cycle is approximately the highest speed at which the fastener can be driven;
   (d) wherein the length of the period of the sine like cycle is approximately that period which provides maximum driving efficiency.

18. The method as recited in claim 17 wherein the step of electronically generating a sine like output comprises the step of digitally generating a sine like cycle using a CPU, the CPU executing an algorithm which determines the shape, amplitude, and period of the sine like cycle.

19. The method as recited in claim 18 wherein the step of electronically generating a sine like output further comprises the steps of:
   (a) modifying the cycle generating algorithms to vary the amplitude of the sine like cycle generated thereby to obtain the highest speed at which the fastener can be driven; and
   (b) modifying the cycle generating algorithm to vary the period of the sine like cycle to provide maximum driving efficiency.

* * * * *